United States Patent
Lindamood et al.

(10) Patent No.: US 8,793,328 B2
(45) Date of Patent: Jul. 29, 2014

(54) DISTRIBUTED STORAGE SYSTEM

(75) Inventors: Jack William Lindamood, Mountain View, CA (US); Douglas John Beaver, San Francisco, CA (US); Apostolos Lerios, Austin, TX (US); Matthew Page, Mountain View, CA (US); Peter Avelino Ruibal, Palo Alto, CA (US)

(73) Assignee: Facebook, Inc., Menlo Park, CA (US)

( * ) Notice: Subject to any disclaimer, the term of this patent is extended or adjusted under 35 U.S.C. 154(b) by 365 days.

(21) Appl. No.: 12/972,220

(22) Filed: Dec. 17, 2010

(65) Prior Publication Data
US 2012/0159099 A1 Jun. 21, 2012

(51) Int. Cl.
*G06F 15/167* (2006.01)
*G06F 13/28* (2006.01)
*G06F 11/00* (2006.01)
*G06F 17/30* (2006.01)

(52) U.S. Cl.
USPC ........... 709/213; 714/6.23; 707/781; 711/162

(58) Field of Classification Search
USPC .................................................. 709/224, 213
See application file for complete search history.

(56) References Cited

U.S. PATENT DOCUMENTS

| 6,119,209 A * | 9/2000 | Bauman et al. ............... 711/162 |
| 8,041,735 B1 * | 10/2011 | Lacapra et al. ............... 707/783 |
| 2004/0236983 A1 * | 11/2004 | Burton et al. ...................... 714/6 |
| 2009/0259747 A1 * | 10/2009 | Sagefalk et al. ............... 709/224 |
| 2011/0238775 A1 * | 9/2011 | Wu et al. ....................... 709/213 |
| 2012/0036161 A1 * | 2/2012 | Lacapra et al. ............... 707/781 |

* cited by examiner

*Primary Examiner* — Emmanuel L Moise
*Assistant Examiner* — Mahran Abu Roumi
(74) *Attorney, Agent, or Firm* — Baker Botts L.L.P.

(57) ABSTRACT

In one embodiment, a first computing device receives a write request and data from a second computing device; iteratively attempts to write the data until a copy of the data is successfully written to each and every storage node belonging to a storage volume; and transmits a volume identifier of the storage volume and a data identifier assigned to the data to the second computing device. In one embodiment, a first computing device receives a read request and a volume identifier and a data identifier from a second computing device; accesses a cache to select the storage volume identified by the volume identifier; iteratively attempts to read data identified by the data identifier until a copy of the data is successfully read from a storage node belonging to the selected storage volume; and transmits the copy of the data to the second computing device.

22 Claims, 6 Drawing Sheets

DISTRIBUTED STORAGE SYSTEM

TECHNICAL FIELD

The present disclosure generally relates to a distributed storage system, and more specifically relates to a distributed storage system that includes one or more routers, where each router locally maintains a cache of storage information.

BACKGROUND

A distributed storage system includes multiple storage nodes, and data may be physically stored on any one of these storage nodes. Distributed storage systems are generally scalable, versatile, and efficient. For example, new storage nodes may be added to a system as the amount of data increases. Malfunctioning storage nodes in a system may be replaced individually. The same data may be duplicated on multiple storage nodes in a system for safe keeping and load balancing.

SUMMARY

The present disclosure generally relates to a distributed storage system, and more specifically relates to a distributed storage system that includes one or more routers, where each router locally maintains a cache of storage information so that the router does not need to access any other computing devices to retrieve storage information during any read or write operations.

In particular embodiments, a distributed storage system includes one or more routers, one or more storage volumes, and one or more storage nodes. In particular embodiments, each storage volume is a virtual storage unit, and may include one or more physical storage nodes. In particular embodiments, the same physical storage node may simultaneously belong to any number of virtual storage volumes. In particular embodiments, each router may access any number of storage volumes. In particular embodiments, each router maintains a cache. The cache may be local to a router or located remotely but is accessible to the router. In particular embodiments, the cache includes one or more storage volumes accessible to the router, and the storage nodes belonging to each storage volume.

In particular embodiments, upon receiving a write request together with the data to be stored in the distributed storage system, a router selects one storage volume from its cache, and attempts to write a copy of the data to each storage node that belongs to the selected storage volume. If a copy of the data is successfully written to each and every storage node that belongs to the selected storage volume, then the router returns a volume identifier of the selected storage volume and a data identifier assigned to the data. If a copy of the data is not successfully written to any storage node that belongs to the selected storage volume, then the router selects another storage volume from its cache and repeats the process, until one storage volume is found in the router's cache where a copy of the data is successfully written to each and every storage node that belongs to that one storage volume. In particular embodiments, if no storage volume may be found where a copy of the data is successfully written to each and every storage node that belongs to that one storage volume, the write operation fails.

In particular embodiments, a first computing device (e.g., a router) receives a write request and data associated with the write request from a second computing device (e.g., a client); iteratively attempts to write the data (e.g., the router iterates over different storage volumes) to one or more storage volumes; and transmits the volume identifier of one of the one or more storage volumes to which the data have been successfully written and a data identifier assigned to the data to the second computing device. In particular embodiments, there may be one or more such first computing devices (e.g., one or more routers) servicing one or more second computing devices (e.g., one or more clients), where a client may contact a router for a write request.

In particular embodiments, during each iteration, the first computing device (e.g., the router) accesses a cache of one or more storage volumes to select one of the one or more storage volumes, wherein: the cache is maintained locally at the first computing device; each one of the one or more storage volumes in the cache is identified by a unique volume identifier, and comprises one or more storage nodes; and the selected one of the one or more storage volumes has not been selected during any previous iteration; write a copy of the data to each one of the one or more storage nodes of the selected one of the one or more storage volumes; if the copy of the data is successfully written to each one of the one or more storage nodes of the selected one of the one or more storage volumes, then end the iterative attempt to write the data; and if the copy of the data is not successfully written to any one of the one or more storage nodes of the selected one of the one or more storage volumes, then start another iteration. Moreover, in particular embodiments, if no storage volume may be found where a copy of the data is successfully written to each and every storage node that belongs to that one storage volume, the write operation fails. The first computing device may send a write failure to the second computing device.

In particular embodiments, upon receiving a read request together with a data identifier identifying the data to be retrieved from the distributed storage system and a volume identifier identifying the storage volume where the data are stored, a router selects the storage volume identified by the volume identifier from its cache. In particular embodiments, if the volume identifier is not present in the cache, the router may contact a name node. The router selects one storage node that belongs to the storage volume, and reads a copy of the data from the selected storage node. If a copy of the data is successfully read from the selected storage node, then the router returns the copy of the data. If a copy of the data is not successfully read from the selected storage node, then the router selects another storage node that belongs to the storage volume and repeats the read attempt, until one storage node that belongs to the storage volume is found where a copy of the data is successfully read from that one storage node. In particular embodiments, if no storage node that belongs to the storage volume may be found from which a copy of the data may be successfully read, the read operation fails.

In particular embodiments, a first computing devices (e.g., a router) receives a read request and a volume identifier and a data identifier associated with the read request from a second computing device (e.g., a client); accesses a cache of one or more storage volumes to select one of the one or more storage volumes identified by the volume identifier, wherein: the cache is maintained locally at the first computing device; and each one of the one or more storage volumes in the cache is identified by a unique volume identifier, and comprises one or more storage nodes; iteratively attempts to read data identified by the data identifier; and transmits the copy of the data to the second computing device.

In particular embodiments, the first computing device (e.g., the router) iteratively selects one of the one or more storage nodes of the selected one of the one or more storage volumes, wherein the selected one of the one or more storage nodes has not been selected during any previous iteration;

reads a copy of the data from the selected one of the one or more storage nodes of the selected one of the one or more storage volumes; if the copy of the data is successfully read from the selected one of the one or more storage nodes of the selected one of the one or more storage volumes, then end the iterative attempt to read the data; and if the copy of the data is not successfully read from the selected one of the one or more storage nodes of the selected one of the one or more storage volumes, then start another iteration. Moreover, in particular embodiments, if no storage node that belongs to the selected one of the one or more storage volumes may be found from which a copy of the data may be successfully read, the read operation fails. The first computing device may send a read failure to the second computing device.

These and other features, aspects, and advantages of the disclosure are described in more detail below in the detailed description and in conjunction with the following figures.

DESCRIPTION OF EXAMPLE EMBODIMENTS

The present disclosure is now described in detail with reference to a few embodiments thereof as illustrated in the accompanying drawings. In the following description, numerous specific details are set forth in order to provide a thorough understanding of the present disclosure. However, the present disclosure may be practiced without some or all of these specific details. In other instances, well known process steps and/or structures have not been described in detail in order not to unnecessarily obscure the present disclosure. In addition, while the disclosure is described in conjunction with the particular embodiments, it should be understood that this description is not intended to limit the disclosure to the described embodiments. To the contrary, the description is intended to cover alternatives, modifications, and equivalents as may be included within the spirit and scope of the disclosure as defined by the appended claims.

Figure 1:
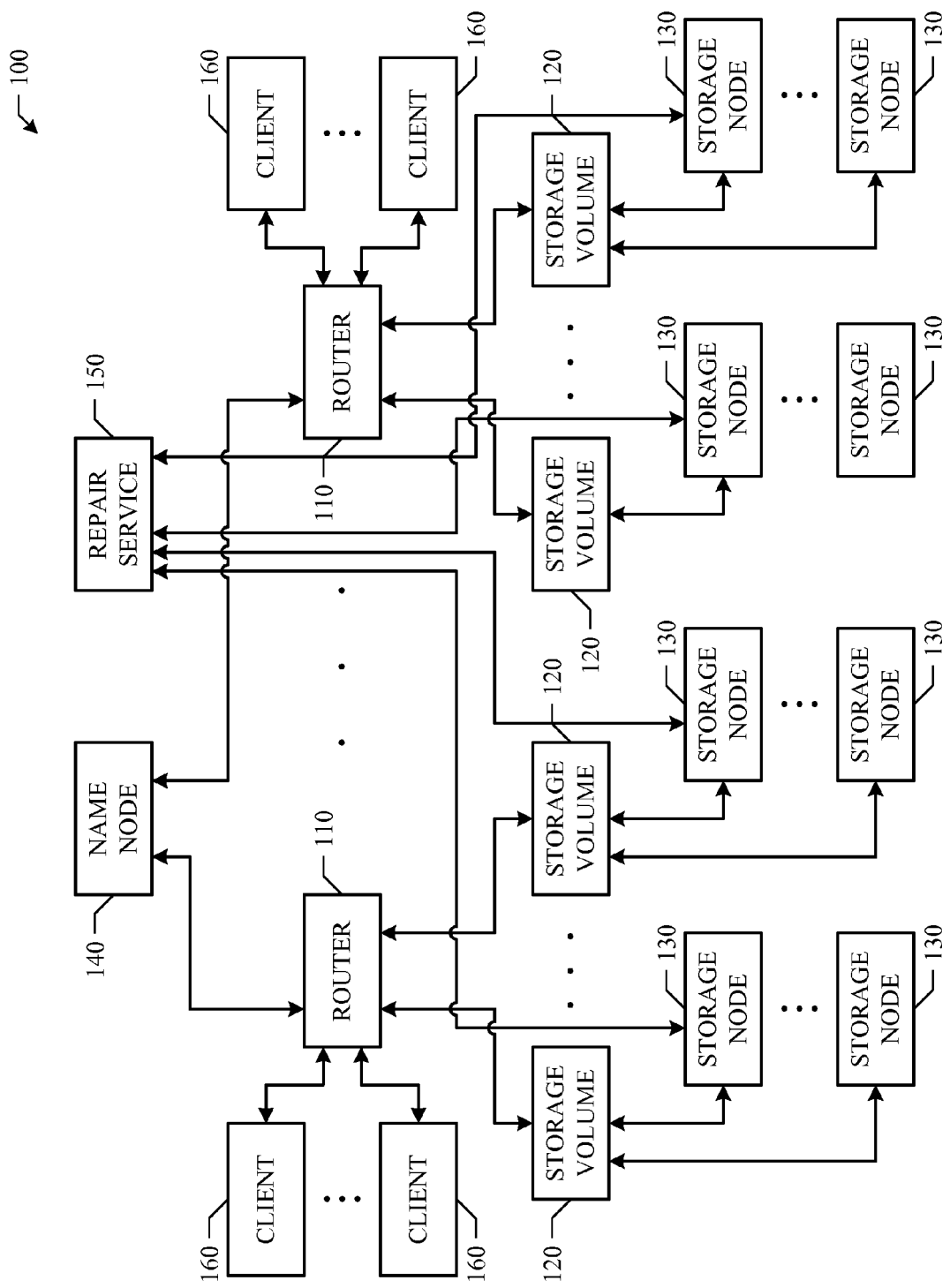
FIG. 1 illustrates an example distributed storage system.

In general, a distributed storage system includes multiple storage nodes, and data may be physically stored on any one of these storage nodes. In practice, there are a variety of architectures, topologies, or configurations for distributed storage systems, such as cloud storage, ring configuration, etc. FIG. 1 illustrates an example distributed storage system 100. In particular embodiments, distributed storage system 100 may include any number of routers 110, any number of storage volumes 120, any number of storage nodes 130, any number of name nodes 140 (to simplify the description, only one name node 140 is illustrated in FIG. 1), and any number of repair services 150 (to simplify the description, only one repair service 150 is illustrated in FIG. 1).

In particular embodiments, each router 110 may include hardware, software, or embedded logic components or a combination of two or more such components for carrying out the appropriate functionalities implemented or supported by the router 110. In particular embodiments, each router 110 is uniquely identified within distributed storage system 100 by a router identifier. That is, each router 110 is associated with a router identifier that is unique within distributed storage system 100. In particular embodiments, each router 110 may access any number of storage volumes 120. In particular embodiments, the same storage volume 120 may be simultaneously accessible to any number of routers 110.

In particular embodiments, each storage volume 120 is a virtual storage unit and may include any number of storage nodes 130. In particular embodiments, each storage volume 120 is uniquely identified within distributed storage system 100 by a volume identifier (VID). That is, each storage volume 120 is associated with a volume identifier that is unique within distributed storage system 100. In particular embodiments, each volume identifier is a 32-bit integer. In particular embodiments, the same storage node 130 may simultaneously belong to any number of storage volumes 120. In particular embodiments, if a router 110 is able to access a storage volume 120, the router 110 is able to access (e.g., performing data read and data write operations) each and every storage node 130 that belongs to the storage volume 120.

In particular embodiments, each storage node 130 is a physical storage unit that may be used to store data. In particular embodiments, each storage node 130 may include hardware, software, or embedded logic components or a combination of two or more such components for carrying out the appropriate functionalities implemented or supported by the storage node 130. In particular embodiments, each storage node 130 may include any suitable storage or file system, such as, for example and without limitation, Network File System (NFS), relational database, Facebook Haystack system, etc. Furthermore, it is not necessary for all storage nodes 130 to include the same storage or file system, and different storage nodes 130 in distributed storage system 100 may include different storage or file systems. In particular embodiments, each storage node 130 is uniquely identified within distributed storage system 100 by a node identifier (NID). That is, each storage node 130 is associated with a node identifier that is unique within distributed storage system 100.

In particular embodiments, name node 140 may include hardware, software, or embedded logic components or a combination of two or more such components for carrying out the appropriate functionalities implemented or supported by name node 140. In particular embodiments, name node 140 is responsible for maintaining information on storage volumes 120 and storage nodes 130 currently in distributed storage system 100. More specifically, name node 140 may keep track of which storage volumes 120 and storage nodes 130 are currently in distributed storage system 100, and for each storage volume 120 currently in distributed storage system 100, which storage nodes 130 currently belong to that storage volume 120.

In particular embodiments, name node 140 is accessible to each router 110. When needed, a router 110 may request information on specific storage volumes 120 or storage nodes 130 from name node 140. For example, a router 110 may request and receive the specific storage nodes 130 that currently belong to a specific storage volume 120 from name node 140.

In particular embodiments, repair service 150 may include hardware, software, or embedded logic components or a combination of two or more such components for carrying out the appropriate functionalities implemented or supported by repair service 150. In particular embodiments, repair service 150 is responsible for repairing or replacing malfunctioning storage nodes 130 in distributed storage system 100. For example, when a specific storage node 130 breaks down, repair service 150 may replace the broken storage node 130 with a new storage node 130. In particular embodiments, repair service 150 repairs or replaces malfunctioning storage nodes 130 in distributed storage system 100 based on a set of policies.

In particular embodiments, repair service 150 is accessible to each storage node 130. Repair service 150 may repair defective storage nodes 130 and proactively monitor the health of each storage node 130. For example, repair service 150 may monitor the health of each storage node 130 using disk drive SMART data.

Alternatively or in addition, in particular embodiments, repair service 150 is accessible to each router 110 and name node 140. When needed, a router 110 may report malfunctioning storage nodes 130 to repair service 150 so that the malfunctioning storage nodes 130 may be repaired or replaced. For example, if a router 110 discovers that a storage node 130 malfunctions, the router 110 may report the malfunctioning storage node 130 to repair service 150. Repair service 150 may subsequently replace the malfunctioning storage node 130 with a new storage node 130. In particular embodiments, when repair service 150 replaces a malfunctioning storage node 130 with a new storage node 130, repair service 150 may notify the replacement to name node 140 so that name node 140 may update the information it maintains on storage volumes 120 and storage nodes 130 currently in distributed storage system 100.

Distributed storage system 100 may be used to store any type of data in connection with any type of application. In one implementation, the data are stored as Binary Large Objects (BLOBs), which data can correspond to photos, videos and/or any other serialized form of data. In an alternative implementation, the data are stored in a structured, column-oriented format (e.g., SQL rows). In particular embodiments, distributed storage system 100 may be a part of a social-networking system. A social network, in general, is a social structure made up of entities, such as individuals or organizations, that are connected by one or more types of interdependency or relationships, such as friendship, kinship, common interest, financial exchange, dislike, or relationships of beliefs, knowledge, or prestige. In more recent years, social networks have taken advantage of the Internet. There are social-networking systems existing on the Internet in the form of social-networking websites. Such social-networking websites enable their members, who are commonly referred to as website users, to perform various social activities. For example, the social-networking website operated by Facebook, Inc. at "www.facebook.com" enables its users to communicate with their friends via emails, instant messages, or blog postings, organize social events, share photos, receive news of their friends or interesting events, play games, etc. In particular embodiments, distributed storage system 100 may be used to store any type of content data (e.g., image files, video files, audio files, text files, etc.) of a social-networking system. For example, users of the social-networking system may upload image files into their respective user accounts, and these image files may be stored at various storage nodes 130

Distributed storage system 100 is highly scalable and versatile. In particular embodiments, additional routers 110, storage nodes 130, name node 140, and repair service 150 may all be added to distributed storage system 100 as the need arises. Similarly, additional storage volumes 120 may be created as the need arises. For example, as the amount of data increases, additional storage nodes 130 may be added to store the new data, and additional storage volumes 120 may be created to include some of the newly added storage nodes 130. As the number of clients increase, additional routers 110 may be added to service the new clients. If a specific router 110 or storage node 130 malfunctions, that malfunctioning router 110 or storage node 130 may be replaced without affecting the other routers 110 or storage nodes 130.

In particular embodiments, the storage nodes 130 that belong to each storage volume 120 may be selected based on a set of policies. For example, a storage volume 120 may have a first storage node 130 physically located in a data center in California, a second storage node 130 physically located in a data center in Texas, and a third storage node 130 physically located in a data center in Virginia. If the data center in Texas is down due to some reason (e.g., power outage or natural disaster), the storage volume 120 still have two more functioning storage nodes 130 located in California and Virginia respectfully. Data access would not be interrupted due to the problem with the data center in Texas. As another example, even though the data centers themselves may function correctly, there may be problems with communications between the individual data centers (e.g., due to faulty communication links or network cables).

In addition, in particular embodiments, the repair policies followed by repair service 150 may stipulate that a malfunctioning storage node 130 should be replaced by a new storage node 130 located at the same geographical location as the malfunctioning storage node 130. This ensures that each storage volume 120 has storage nodes 130 physically located at different geographical locations.

In particular embodiments, some of storage nodes 130 may be more advanced than other storage nodes 130 (e.g., better hardware or newer software). From time to time, data may be migrated between storage nodes 130. For example, older data (e.g., data that have not be accessed for some period of time) may be migrated to less-advanced storage nodes 130, while newer data or frequently-accessed data may be migrated to more-advanced storage nodes 130.

Figure 2:
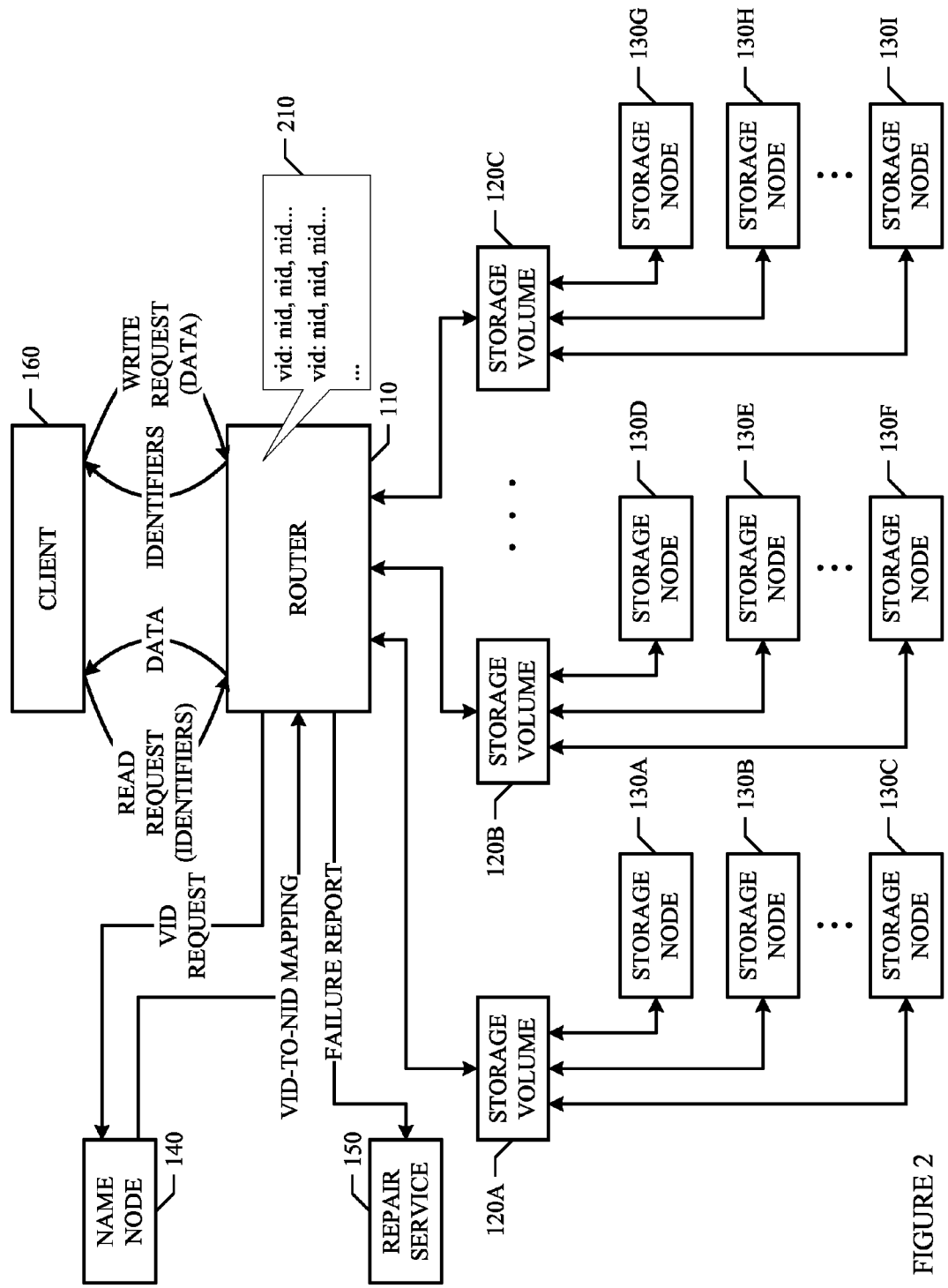
FIG. 2 illustrates an example router in an example distributed storage system.

In particular embodiments, each router 110 may service data read and data write requests from any number of clients 160. FIG. 2 illustrates an example router 110 in distributed storage system 100 in more detail. To simplify the description, only one client 160 is illustrated in FIG. 2. However, router 110 may service data read and data write requests from each one of any number of clients 160 in a similar manner.

In particular embodiments, router 110 maintains a cache 210 of storage volumes 120 and storage nodes 130 locally. In particular embodiments, a storage volume 120 that is accessible to router 110 is included in cache 210. In particular embodiments, each storage volume 120 in cache 210 is uniquely identified by its corresponding volume identifier. In particular embodiments, for each storage volume 120 in cache 210, the storage nodes 130 that belong to the storage volume 120 are also included in cache 210, in connection with the corresponding storage volume 120. In particular embodiments, each storage node 130 in cache 210 is uniquely identified by its corresponding node identifier. In particular embodiments, each storage volume 120 in cache 210 has an expiration time for the cache entries. For example, the expiration time for the cache entries of each storage volume 120 in cache 210 may be represented as "time to live" (TTL), which, in general, is a limit on the period of time or number of iterations or transmissions a unit of data may experience before it should be discarded. When the expiration time of a storage volume 120 in cache 210 has passed, router 110 may update the storage nodes 130 that belong to the now-expired storage volume 120 in cache 210 by requesting the storage nodes 130 that currently belong to the storage volume 120 from name node 140 and storing the updated storage nodes 130 in cache 210 in connection with the storage volume 120.

In particular embodiments, the cached data may still be used between the time from the expiration of the cached entries to the retrieval of the updated data from name node 140. For example, the cached data may still be used even after the expiration of the TTL of the cache entries so as not to block operations to name node 140 during the time between the expiration of the TTL and the retrieval of the updated data from name node 140.

In particular embodiments, during certain read or write operations, cache 210 of a particular storage volume 120 may be deemed inadequate and/or obsolete. In this case, name node 140 may need to be contacted to obtain metadata about the stored data. In particular embodiments, the metadata of the stored data may be the vid-to-nid mapping illustrated in FIG. 2. In particular embodiments, certain read or writes may cause router 110 to access storage nodes 130 to get to the actual data.

The following illustrates an example of a cache locally maintained by a router. In this example, there are a number of volume identifiers in the cache identifying the specific storage volumes accessible to the router. Each volume identifier is associated with a number of node identifiers identifying the specific storage nodes that belong to the corresponding storage volume. For example, storage nodes 3, 6, 10 belong to storage volume 11; storage nodes 1, 10, 32 belong to storage volume 12; storage nodes 7, 32, 51 belong to storage volume 13; and storage nodes 5, 21, 26, belong to storage volume 14. In addition, each volume identifier is associated with an expiration time, expressed in number of seconds.

| Volume Identifier | Node Identifiers | Expiration Time (min) |
|---|---|---|
| ... | ... | ... |
| 11 | 3, 6, 10 | 5 |
| 12 | 1, 10, 32 | 7 |
| 13 | 7, 32, 51 | 8 |
| 14 | 5, 21, 26 | 5 |
| ... | ... | ... |

An Example of a Cache Maintained by a Router

In particular embodiments, if router 110 discovers that any storage node 130 malfunctions (e.g., during a data read or data write operation in connection with a specific storage node 130), router 110 may report the malfunctioning storage node 130 to repair service 150 so that repair service 150 may repair or replace the malfunctioning storage node 130 in due course. In particular embodiments, router 110 may also notify the other routers 110 in distributed storage system 100 about the malfunctioning storage node 130 (e.g., via peer-to-peer communications) so that the other routers 110 are able to handle the malfunctioning storage node 130 appropriately.

In particular embodiments, each storage volume 120 in cache 210 may be associated with a write indicator, which indicates whether the storage volume 120 may be selected for a data write operation. In particular embodiments, each storage node 130 in cache 210 may be associated with a read indicator, which indicates whether the storage node 130 may be selected for a data read operation. In particular embodiments, each write indicator and read indicator may be implemented as a Boolean value (e.g., with the value 1 indicating may be selected for a write or read operation, and with the value 0 indicating may not be selected for a write or read operation).

In particular embodiments, when a new router 110 is first added to distributed storage system 100, its cache 210 may be initialized to include an initial set of storage volumes 120 and their associated storage nodes 130. In particular embodiments, the initial set of storage volumes 120 and their associated storage nodes 130 used for initializing cache 210 of the new router 110 may be determined based on the physical location of the new router 110 in distributed storage system 100 (i.e., the topology of distributed storage system 100). For example, the initial storage nodes 130 to be included in cache 210 of the new router 110 may be those storage nodes 130 located near the new router 110.

Figure 3:
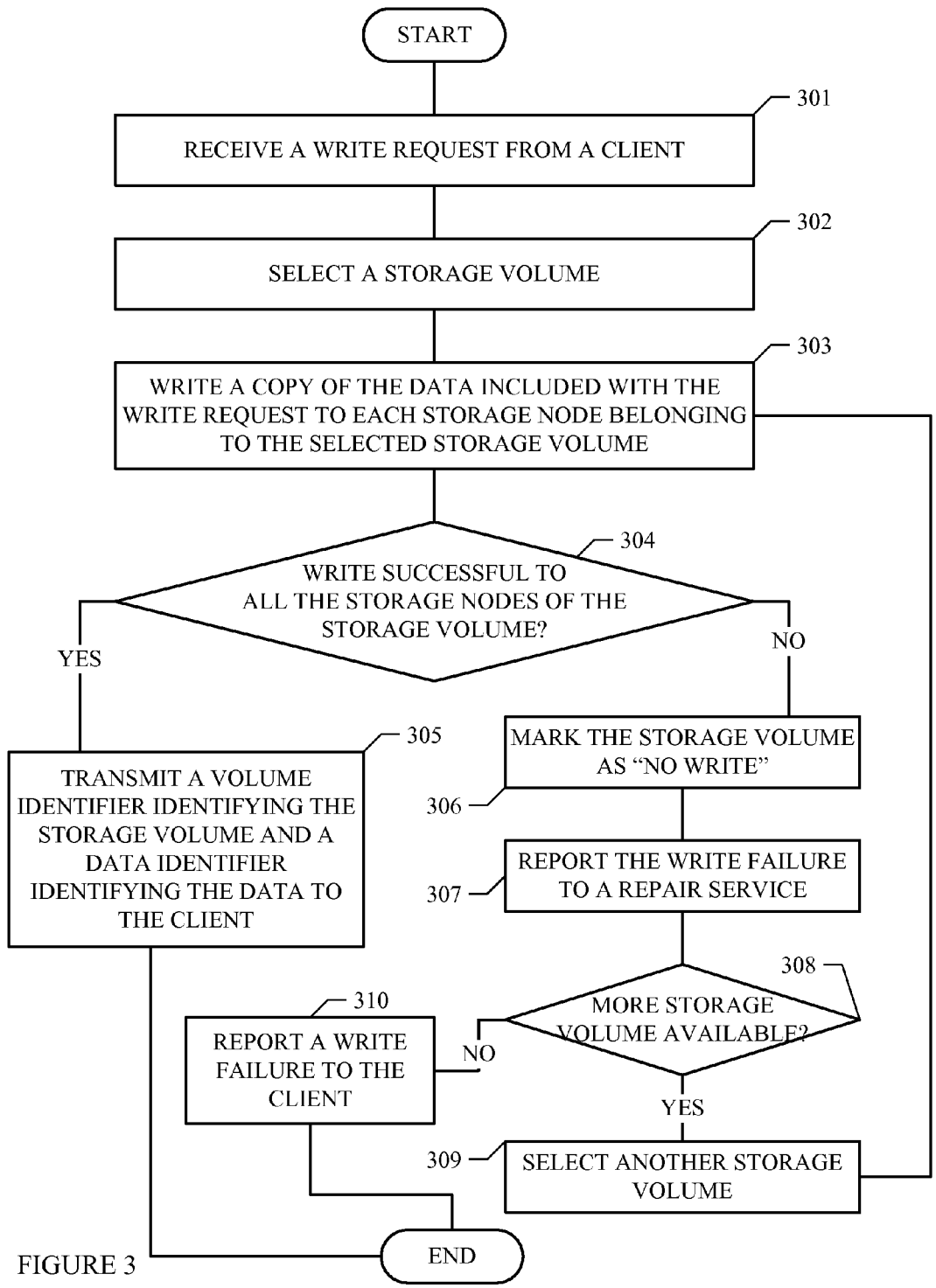
FIG. 3 illustrates an example method for writing data to a distributed storage system.

FIG. 3 illustrates an example method for writing data to a distributed storage system. Specific steps of FIG. 3 may be described in connection with FIGS. 1 and 2. In particular embodiments, the steps of FIG. 3 may be performed by a router 110 when servicing a data write request from a client 160.

In particular embodiments, when a client (e.g., client 160 in FIG. 2) wishes to store data (e.g., content data, such as image, video, audio, or text files) in a distributed storage system (e.g., distributed storage system 100 in FIG. 1), the client may send a write request together with the data to be stored to a router (e.g., router 110 in FIG. 2). The router receiving and processing the write request may be a router in the distributed storage system that is physically located near the client or has available resources to process the current write request.

Upon receiving the write request and the data to be stored, as illustrated in STEP 301, the router may access its locally maintained cache (e.g., cache 210 in FIG. 2) to select a storage volume (e.g., storage volume 120A in FIG. 2) for the write operation, as illustrated in STEP 302. In particular embodiments, the write indicator of the selected storage volume indicates that the storage volume can be selected for write operations. In other words, when selecting a storage volume from its cache for the current write request, the router only selects from those storage volumes having write indicators that indicate the corresponding storage volumes can be selected for write operations.

When the router attempts to select a storage volume for the write operation, it is possible that there is no storage volume currently available for a write operation. For example, the system may have reached its storage capacity at the moment so that there is no sufficient storage currently available to store copies of the data received from the client. As another example, due to various reasons, all the storage volumes may have their corresponding write indicators indicating that the storage volumes cannot be selected for write operations at the moment. In such a case, in particular embodiments, the write operation fails. The router may send a write failure to the client and terminates the write operation.

In particular embodiments, the router attempts to store (i.e., write) a copy of the data to each of the storage nodes that belong to the selected storage volume, as illustrated in STEP 303. For example, suppose storage volume 120A includes three storage nodes 130A, 130B, 130C. In this case, a copy of the data is written to each of storage nodes 130A, 130B, 130C.

In particular embodiments, if a copy of the data is successfully written to each and every storage node belonging to the selected storage volume (e.g., a copy of the data is successfully written to each of storage nodes 130A, 130B, 130C), as illustrated in STEP 304-YES, the router may assign a unique data identifier to the data, and then transmit the volume identifier of the selected storage volume and the data identifier to the client, as illustrated in STEP 305. The data identifier may be unique within the selected storage volume or within the entire distributed storage system. In particular embodiments, each data identifier is a 64-bit integer. In particular embodiments, the volume identifier and the data identifier may be included in a pointer for transmission to the client. The client, upon receiving the volume identifier and data identifier, may store the two identifiers for subsequent uses. In this case, multiple copies of the same data are stored on multiple storage nodes so that the data are duplicated. If one of the storage nodes malfunctions, there are still other storage nodes where the data are preserved.

On the other hand, if a copy of the data is not successfully written to any one of the storage nodes belonging to the selected storage volume (e.g., a copy of the data is not successfully written to storage node 130A), as illustrated in STEP 304-NO, the router may set the read indicator of the failing storage node to indicate that the failing storage node can not be selected for read operations, and set the write indicator of the selected storage volume to indicate that the selected storage volume can not be selected for write operations, as illustrated in STEP 306. Note that if a storage node can not be selected for read operations, it implies that the same storage node can not be selected for write operations as well, because the storage node is malfunctioning. In particular embodiments, the router may report the write failure to a repair service (e.g., repair service 150 in FIG. 2) together with the node identifier of the failing storage node and optionally with the volume identifier of the selected storage volume, as illustrated in STEP 307, so that the repair service may repair or replace the failing storage node in due course.

In particular embodiments, the router may determine whether there is any more storage volume left in its cache that has not been selected before for the current write request and whose write indicator indicates that the storage volume can be selected for write operations, as illustrated in STEP 308.

If so, in particular embodiments, the router may access its local cache to select another storage volume that has not been selected before for the current write request and whose write indicator indicates that the storage volume can be selected for write operations, as illustrated in STEP 309. For example, suppose storage volumes 120B and 120C in FIG. 2 have not been selected for the current write request. However, the write indicator of storage volume 120B indicates that storage volume 120B can not be selected for write operations. In this case, the router may select storage volume 120C instead, and perform STEPS 303-304 again in connection with storage volume 120C. STEPS 303-309 may be repeated until a storage volume is found in the cache such that a copy of the data is successfully written to each and every storage node belonging to that storage volume, at which time the iterations may end. For example, if a copy of the data is successfully written to each of storage nodes 130G, 130H, 130I, which all belong to storage volume 120C, the iterations may end. The router may transmit the volume identifier of storage volume 120C and the data identifier assigned to the data to the client.

On the other hand, if there is no more storage volume left in the router's local cache that has not been selected before for the current write request and whose write indicator indicates that the storage volume can be selected for write operations, the router may report a write failure to the client, as illustrated in STEP 310.

Figure 4:
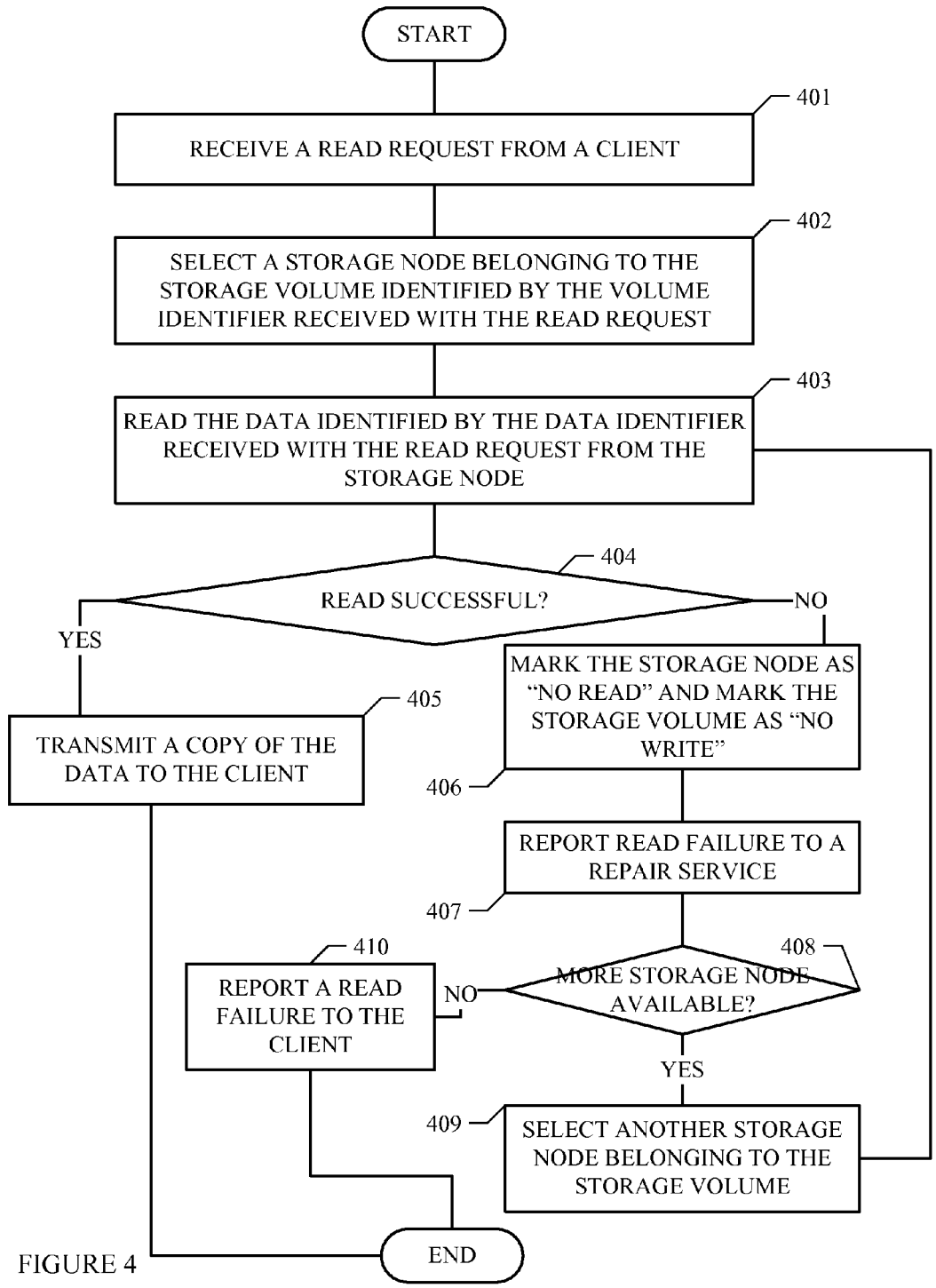
FIG. 4 illustrates an example method for reading data from a distributed storage system.

FIG. 4 illustrates an example method for reading data from a distributed storage system. Specific steps of FIG. 3 may be described in connection with FIGS. 1 and 2. In particular embodiments, the steps of FIG. 3 may be performed by a router 110 when servicing a data read request from a client 160.

In particular embodiments, when a client (e.g., client 160 in FIG. 2) wishes to retrieve data (e.g., content data, such as image, video, audio, or text files) stored in a distributed storage system (e.g., distributed storage system 100 in FIG. 1), the client may send a read request together a volume identifier and a data identifier to a router (e.g., router 110 in FIG. 2). The data identifier identifies the data to be retrieved, and the volume identifier identifies the storage volume where the data are stored. Recall that when data are stored in the distributed storage system, the client sending the write request receives a volume identifier identifying the storage volume where the data are stored and a data identifier assigned to the stored data from the router processing the write request. Thus, subsequently, when the client wishes to retrieve the stored data, the client may send a read request with the appropriate volume identifier and data identifier to a router.

The router receiving and processing the read request may be a router in the distributed storage system that is physically located near the client or has available resources to process the current read request. In particular embodiments, it is not necessary for the same router to service write and read requests with respect to the same data. For example, when storing data, a client may send the write request with the data to be stored to one router. Subsequently, when retrieving the same data, the client may send the read request to the same or to another router. Furthermore, one client may send a write request to store data, and subsequently, another client may send a read request to retrieve that same data, as long as the second client is allowed to access that data and has the appropriate volume identifier identifying the storage volume where the data are stored and data identifier assigned to the stored data.

Upon receiving the read request with the volume identifier and the data identifier, as illustrated in STEP 401, the router may access its locally maintained cache (e.g., cache 210 in FIG. 2) to select the storage volume identified by the volume identifier (e.g., storage volume 120A in FIG. 2) for the read operation. The cache includes information on which storage nodes belong to which storage volumes. Thus, based on the information maintained in the cache, the router is able to determine the specific storage nodes that belong to the selected storage volume (i.e., the storage volume that is identified by the volume identifier).

When the router attempts to select storage volume identified by the volume identifier received from the client, it is possible that the volume identifier does not identify any storage volume currently available in the system. For example, the client may have sent an incorrect volume identifier that does not correspond to any storage volume in the system. In such a case, in particular embodiments, the read operation fails. The router may send a read failure to the client and terminates the read operation.

In particular embodiments, the router selects one of the storage nodes that belong to the selected storage volume (e.g., storage node 130A belonging to storage volume 120A in FIG. 2), as illustrated in STEP 402. In particular embodiments, the read indicator of the selected storage node indicates that the storage node can be selected for read operations. In other words, when selecting a storage node that belongs to the selected storage volume for the current read request, the router only selects from those storage nodes belonging to the selected storage volume that have read indicators that indicate the corresponding storage nodes can be selected for read operations.

In particular embodiments, the router attempts to retrieve (i.e., read) a copy of the data identified by the data identifier from the selected storage node, as illustrated in STEP 403.

For example, if the storage node belonging to storage volume 120A selected is storage node 130A, then the router may attempt to retrieve a copy of the data from storage node 130A.

In particular embodiments, if a copy of the data is successfully read from the selected storage node (e.g., a copy of the data is successfully read from storage node 130A), as illustrated in STEP 404-YES, the router may transmit the copy of the data to the client, as illustrated in STEP 405.

On the other hand, if a copy of the data is not successfully read from the selected storage node (e.g., a copy of the data is not successfully read from storage node 130A), as illustrated in STEP 404-NO, the router may take different actions depending on the specific reason why a copy of the data cannot be read from the selected storage node. On the one hand, the requested data may not be present in the selected storage node. For example, the client may have sent an incorrect volume identifier and/or data identifier in the read request. In this case, the selected storage node may function normally and correctly but the data identified by the incorrect data identifier are simply not available in the selected storage node. In this case, the selected storage node may indicate to the router that it does not possess the data identified by the incorrect data identifier, and the router may then select another storage node belonging to the selected storage volume and attempt to read a copy of the data from the newly selected storage node.

On the other hand, the selected storage node may be malfunctioning or has failed, which is the cause of the read failure. In this case, the router may set the read indicator of the failing storage node to indicate that the failing storage node can not be selected for read operations, and set the write indicator of the selected storage volume to indicate that the selected storage volume can not be selected for write operations, as illustrated in STEP 406. Note that if a storage node can not be selected for read operations, it implies that the same storage node can not be selected for write operations as well, because the storage node is malfunctioning. In particular embodiments, the router may report the read failure to a repair service (e.g., repair service 150 in FIG. 2) together with the node identifier of the failing storage node and optionally with the volume identifier of the selected storage volume, as illustrated in STEP 407, so that the repair service may repair or replace the failing storage node in due course.

In particular embodiments, the router may determine if there is any more storage node belonging to the selected storage volume remaining that has not been selected before for the current read request and whose read indicator indicates that the storage node can be selected for read operations, as illustrated in STEP 408.

If so, in particular embodiments, the router may select another storage node belonging to the selected storage volume that has not been selected before for the current read request and whose read indicator indicates that the storage node can be selected for read operations, as illustrated in STEP 409. For example, suppose storage nodes 130B and 130C in FIG. 2, which belong to storage volume 120A, have not been selected for the current read request. However, the read indicator of storage node 130B indicates that storage node 130B can not be selected for read operations. In this case, the router may select storage node 130C instead, and perform STEPS 403-404 again in connection with storage node 130C. STEPS 403-409 may be repeated until a storage node belong to the selected storage volume is found such that a copy of the data is successfully from that storage node, at which time the iterations may end. For example, if a copy of the data is successfully read from storage node 130C, the iterations may end. The router may transmit the copy of the data to the client.

On the other hand, if there is no more storage node belonging to the selected storage volume remains that has not been selected before for the current read request and whose read indicator indicates that the storage node can be selected for read operations, the router may report a read failure to the client, as illustrated in STEP 410.

As described in connection with FIGS. 3 and 4, in particular embodiments, a volume identifier and a data identifier are used in connection with each set of data stored in the system during a read or write operation. The volume identifier identifies the specific storage volume where copies of the data are stored, and the data identifier identifies the specific set of data stored in a storage volume. In particular embodiments, each volume identifier and/or data identifier may be associated with a scrambler number, which may be randomly generated. Thus, each volume identifier may have a randomly generated volume-scrambler number, and each data identifier may have a randomly generated data-scrambler number. Different embodiments may (1) use only volume identifiers and data identifiers, or (2) use volume identifiers, data identifiers, and volume-scrambler numbers, or (3) use volume identifiers, data identifiers, and data-scrambler numbers, or (4) use volume identifiers, data identifiers, volume-scrambler numbers, and data-scrambler numbers.

In particular embodiments, when a storage volume is first created, it is assigned a volume identifier and a randomly generated volume-scrambler number. The volume-scrambler number of a storage volume may be stored together with its node identifiers in a router's cache. In particular embodiments, the volume identifier and the volume-scrambler number are both unique within the system such that different storage volumes are assigned different volume identifiers and the volume-scrambler numbers.

In particular embodiments, when a set of data is successfully stored in a storage volume, it is assigned a data identifier and a randomly generated data-scrambler number. The data-scrambler number of a set of data may be stored together with the set of data in the storage volume. In particular embodiments, the data identifier and the data-scrambler number may be unique within the system or unique only within the specific storage volume where copies of the data are stored.

In particular embodiments, when a set of data is successfully stored in a storage volume during a write operation, in addition to sending the client the volume identifier that identifies the storage volume where the data are stored and the data identifier assigned to the data, the router may also send the client the corresponding volume-scrambler number if volume-scrambler numbers are used, or the corresponding data-scrambler number if data-scrambler numbers are used, or both if both scrambler numbers are used.

In particular embodiments, during a read operation, in addition to sending a volume identifier that identifies a specific storage volume where a set of data is stored and a data identifier that identifies the set of data itself, the client may also send the router the corresponding volume-scrambler number if volume-scrambler numbers are used, or the corresponding data-scrambler number if data-scrambler numbers are used, or both if both scrambler numbers are used.

If volume-scrambler numbers are used, the router may select the storage volume identified by the volume identifier, and then compare the volume-scrambler number stored in the router's cache corresponding to the selected storage volume with the volume-scrambler number received from the client. If the two volume-scrambler numbers match, then the read operation may proceed to the next step. Otherwise, if the two volume-scrambler numbers do not match, then the read operation fails, and the router may send a read failure to the client.

If data-scrambler numbers are used, the router may select the data identified by the data identifier from the storage volume identified by the volume identifier. Then, in particular embodiments, the router may compare the data-scrambler number stored with the selected data with the data-scrambler number received from the client. Alternatively, in particular embodiments, the router may provide the data-scrambler number stored with the selected data and the data-scrambler number received from the client to the selected storage volume, and a storage node from the selected storage volume may compare the two data-scrambler numbers. If the two data-scrambler numbers match, then the router sends a copy of the selected data to the client. Otherwise, if the two data-scrambler numbers do not match, then the read operation fails, and the router may send a read failure to the client.

If both volume-scrambler numbers and data-scrambler numbers are used, then both scrambler numbers may be compared as described above. If either corresponding pair of scrambler numbers do not match, then the read operation fails, and the router may send a read failure to the client. The scrambler numbers may provide an added level of security against unauthorized data access. For example, a malicious client may attempt to access data that it is not authorized to access (e.g., the malicious client has not been supplied with the volume and data identifiers or the scrambler numbers by a device controlling the access to the storage system) by iteratively providing to a router a sequence of numbers as volume identifiers and data identifiers. Note that the volume identifiers and data identifiers are not necessarily numbers in sequence. They may be randomly generated numbers as well. In this case, the volume-scrambler numbers and/or the data-scrambler numbers, which are both randomly generated numbers, provide additional security as it is much more difficult to correctly guess a randomly generated number.

As FIGS. 3 and 4 indicate, in particular embodiments, while a router services a write or read request from a client, the router does not need to access a name node (e.g., name node 140 in FIG. 2) to retrieve storage volume and storage node information. Instead, the router only needs to access its locally maintained cache to determine which specific storage volumes are available for write operations, which specific storage nodes are available for read operations, and which storage nodes belong to which storage volumes. In particular embodiments, each storage volume includes multiple storage nodes. For each write request, a specific storage volume is selected and a copy of the data is stored on each and every storage node that belongs to the selected storage volume. Subsequently, if any storage node malfunctions, there are still other functioning storage nodes from which a copy of the data may be retrieved. Thus, a malfunctioning storage node does not result in the complete loss of the data. For each read request, a copy of the data may be retrieved from any one of the functioning storage nodes belonging to the storage volume where the data are stored. Thus, as long as there is at least one functioning storage node in a storage volume, a copy of the data may be retrieved from that functioning storage node.

Each router may update the information in its cache from time to time. For example, a router may update its cache at a time when it is not busy servicing write and read requests from clients. When updating its cache, a router may retrieve the current information on the storage volumes and storage nodes, such as which specific storage volumes and storage nodes currently exist in the distributed storage system and their identifiers, and which storage nodes currently belong to which storage volumes, from a name node (e.g., name node 140 in FIG. 2), and store the current information in its cache.

Figure 5:
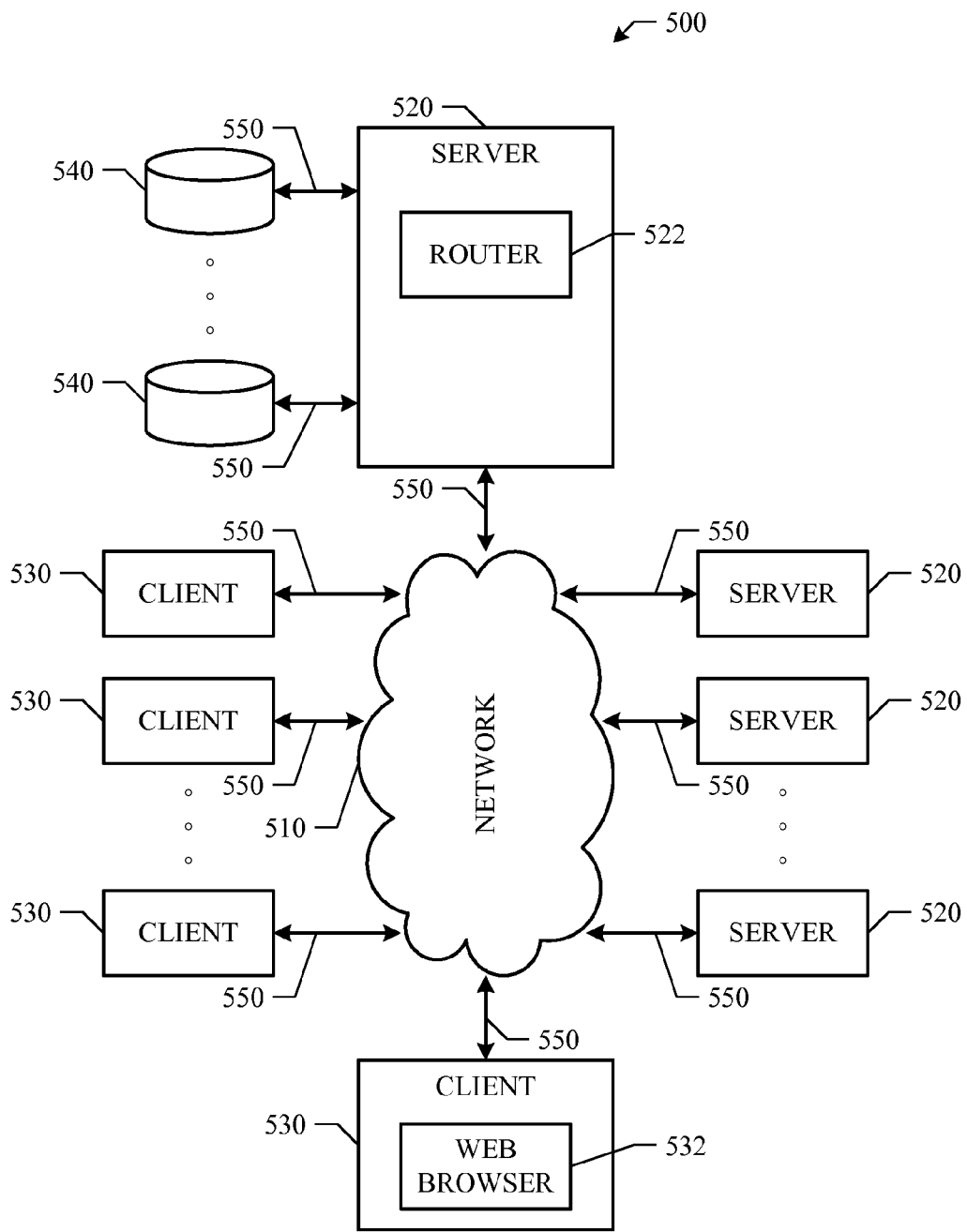
FIG. 5 illustrates an example network environment.

Particular embodiments may be implemented in a network environment. FIG. 5 illustrates an example network environment 500 suitable for providing software validation as a service. Network environment 500 includes a network 510 coupling one or more servers 520 and one or more clients 530 to each other. In particular embodiments, network 510 is an intranet, an extranet, a virtual private network (VPN), a local area network (LAN), a wireless LAN (WLAN), a wide area network (WAN), a metropolitan area network (MAN), a portion of the Internet, or another network 510 or a combination of two or more such networks 510. The present disclosure contemplates any suitable network 510.

One or more links 550 couple a server 520 or a client 530 to network 510. In particular embodiments, one or more links 550 each includes one or more wireline, wireless, or optical links 550. In particular embodiments, one or more links 550 each includes an intranet, an extranet, a VPN, a LAN, a WLAN, a WAN, a MAN, a portion of the Internet, or another link 550 or a combination of two or more such links 550. The present disclosure contemplates any suitable links 550 coupling servers 520 and clients 530 to network 510.

In particular embodiments, each server 520 may be a unitary server or may be a distributed server spanning multiple computers or multiple datacenters. Servers 520 may be of various types, such as, for example and without limitation, web server, news server, mail server, message server, advertising server, file server, application server, exchange server, database server, or proxy server. In particular embodiments, each server 520 may include hardware, software, or embedded logic components or a combination of two or more such components for carrying out the appropriate functionalities implemented or supported by server 520. For example, a web server is generally capable of hosting websites containing web pages or particular elements of web pages. More specifically, a web server may host HTML files or other file types, or may dynamically create or constitute files upon a request, and communicate them to clients 530 in response to HTTP or other requests from clients 530. A mail server is generally capable of providing electronic mail services to various clients 530. A database server is generally capable of providing an interface for managing data stored in one or more data stores.

In particular embodiments, a router 522 may reside on a server 520. Router 522 may include hardware, software, or embedded logic components or a combination of two or more such components for carrying out the processes illustrated in FIGS. 3 and 4.

In particular embodiments, one or more data storages 540 may be communicatively linked to one or more severs 520 via one or more links 550. In particular embodiments, data storages 540 may be used to store various types of information. In particular embodiments, the information stored in data storages 540 may be organized according to specific data structures. In particular embodiment, each data storage 540 may be a relational database. Particular embodiments may provide interfaces that enable servers 520 or clients 530 to manage, e.g., retrieve, modify, add, or delete, the information stored in data storage 540.

In particular embodiments, each client 530 may be an electronic device including hardware, software, or embedded logic components or a combination of two or more such components and capable of carrying out the appropriate functionalities implemented or supported by client 530. For example and without limitation, a client 530 may be a desktop computer system, a notebook computer system, a netbook computer system, a handheld electronic device, or a mobile telephone. In particular embodiments, a client 530 may be one or more services provided by Akamai, which may download various content or data, cache them, and then deliver them to other clients 530 as needed. The present disclosure contemplates any suitable clients 530. A client 530 may enable a network user at client 530 to access network 530. A client 530 may enable its user to communicate with other users at other clients 530.

A client 530 may have a web browser 532, such as MICROSOFT INTERNET EXPLORER, GOOGLE CHROME or MOZILLA FIREFOX, and may have one or more add-ons, plug-ins, or other extensions, such as TOOL-BAR or YAHOO TOOLBAR. A user at client 530 may enter a Uniform Resource Locator (URL) or other address directing the web browser 532 to a server 520, and the web browser 532 may generate a Hyper Text Transfer Protocol (HTTP) request and communicate the HTTP request to server 520. Server 520 may accept the HTTP request and communicate to client 530 one or more Hyper Text Markup Language (HTML) files responsive to the HTTP request. Client 530 may render a web page based on the HTML files from server 520 for presentation to the user. The present disclosure contemplates any suitable web page files. As an example and not by way of limitation, web pages may render from HTML files, Extensible Hyper Text Markup Language (XHTML) files, or Extensible Markup Language (XML) files, according to particular needs. Such pages may also execute scripts such as, for example and without limitation, those written in JAVASCRIPT, JAVA, MICROSOFT SILVERLIGHT, combinations of markup language and scripts such as AJAX (Asynchronous JAVASCRIPT and XML), and the like. Herein, reference to a web page encompasses one or more corresponding web page files (which a browser may use to render the web page) and vice versa, where appropriate.

Figure 6:
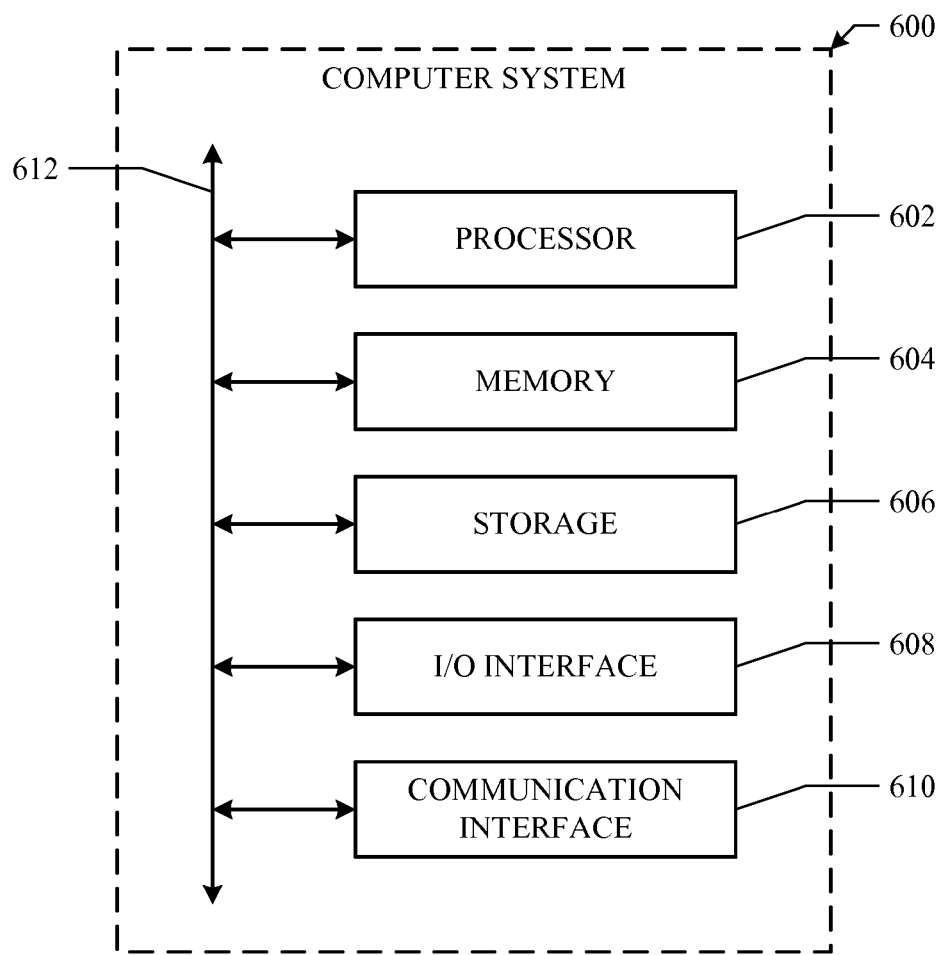
FIG. 6 illustrates an example computer system.

Particular embodiments may be implemented on one or more computer systems. FIG. 6 illustrates an example computer system 600, which may be used to implement a router (e.g., router 110 in FIG. 1). In particular embodiments, one or more computer systems 600 perform one or more steps of one or more methods described or illustrated herein. In particular embodiments, one or more computer systems 600 provide functionality described or illustrated herein. In particular embodiments, software running on one or more computer systems 600 performs one or more steps of one or more methods described or illustrated herein or provides functionality described or illustrated herein. Particular embodiments include one or more portions of one or more computer systems 600.

This disclosure contemplates any suitable number of computer systems 600. This disclosure contemplates computer system 600 taking any suitable physical form. As example and not by way of limitation, computer system 600 may be an embedded computer system, a system-on-chip (SOC), a single-board computer system (SBC) (such as, for example, a computer-on-module (COM) or system-on-module (SOM)), a desktop computer system, a laptop or notebook computer system, an interactive kiosk, a mainframe, a mesh of computer systems, a mobile telephone, a personal digital assistant (PDA), a server, or a combination of two or more of these. Where appropriate, computer system 600 may include one or more computer systems 600; be unitary or distributed; span multiple locations; span multiple machines; or reside in a cloud, which may include one or more cloud components in one or more networks. Where appropriate, one or more computer systems 600 may perform without substantial spatial or temporal limitation one or more steps of one or more methods described or illustrated herein. As an example and not by way of limitation, one or more computer systems 600 may perform in real time or in batch mode one or more steps of one or more methods described or illustrated herein. One or more computer systems 600 may perform at different times or at different locations one or more steps of one or more methods described or illustrated herein, where appropriate.

In particular embodiments, computer system 600 includes a processor 602, memory 604, storage 606, an input/output (I/O) interface 608, a communication interface 610, and a bus 612. Although this disclosure describes and illustrates a particular computer system having a particular number of particular components in a particular arrangement, this disclosure contemplates any suitable computer system having any suitable number of any suitable components in any suitable arrangement.

In particular embodiments, processor 602 includes hardware for executing instructions, such as those making up a computer program. As an example and not by way of limitation, to execute instructions, processor 602 may retrieve (or fetch) the instructions from an internal register, an internal cache, memory 604, or storage 606; decode and execute them; and then write one or more results to an internal register, an internal cache, memory 604, or storage 606. In particular embodiments, processor 602 may include one or more internal caches for data, instructions, or addresses. The present disclosure contemplates processor 602 including any suitable number of any suitable internal caches, where appropriate. As an example and not by way of limitation, processor 602 may include one or more instruction caches, one or more data caches, and one or more translation lookaside buffers (TLBs). Instructions in the instruction caches may be copies of instructions in memory 604 or storage 606, and the instruction caches may speed up retrieval of those instructions by processor 602. Data in the data caches may be copies of data in memory 604 or storage 606 for instructions executing at processor 602 to operate on; the results of previous instructions executed at processor 602 for access by subsequent instructions executing at processor 602 or for writing to memory 604 or storage 606; or other suitable data. The data caches may speed up read or write operations by processor 602. The TLBs may speed up virtual-address translation for processor 602. In particular embodiments, processor 602 may include one or more internal registers for data, instructions, or addresses. The present disclosure contemplates processor 602 including any suitable number of any suitable internal registers, where appropriate. Where appropriate, processor 602 may include one or more arithmetic logic units (ALUs); be a multi-core processor; or include one or more processors 602. Although this disclosure describes and illustrates a particular processor, this disclosure contemplates any suitable processor.

In particular embodiments, memory 604 includes main memory for storing instructions for processor 602 to execute or data for processor 602 to operate on. As an example and not by way of limitation, computer system 600 may load instructions from storage 606 or another source (such as, for example, another computer system 600) to memory 604. Processor 602 may then load the instructions from memory 604 to an internal register or internal cache. To execute the instructions, processor 602 may retrieve the instructions from the internal register or internal cache and decode them. During or after execution of the instructions, processor 602 may write one or more results (which may be intermediate or final results) to the internal register or internal cache. Processor 602 may then write one or more of those results to memory 604. In particular embodiments, processor 602 executes only instructions in one or more internal registers or internal caches or in memory 604 (as opposed to storage 606 or elsewhere) and operates only on data in one or more internal registers or internal caches or in memory 604 (as opposed to storage 606 or elsewhere). One or more memory buses (which may each include an address bus and a data bus) may couple processor 602 to memory 604. Bus 612 may include one or more memory buses, as described below. In particular embodiments, one or more memory management units (MMUs) reside between processor 602 and memory 604 and facilitate accesses to memory 604 requested by processor 602. In particular embodiments, memory 604 includes random access memory (RAM). This RAM may be volatile memory, where appropriate Where appropriate, this RAM may be dynamic RAM (DRAM) or static RAM (SRAM). Moreover, where appropriate, this RAM may be single-ported or multi-ported RAM. The present disclosure contemplates any suitable RAM. Memory 604 may include one or more memories 604, where appropriate. Although this disclosure describes and illustrates particular memory, this disclosure contemplates any suitable memory.

In particular embodiments, storage 606 includes mass storage for data or instructions. As an example and not by way of limitation, storage 606 may include an HDD, a floppy disk drive, flash memory, an optical disc, a magneto-optical disc, magnetic tape, or a Universal Serial Bus (USB) drive or a combination of two or more of these. Storage 606 may include removable or non-removable (or fixed) media, where appropriate. Storage 606 may be internal or external to computer system 600, where appropriate. In particular embodiments, storage 606 is non-volatile, solid-state memory. In particular embodiments, storage 606 includes read-only memory (ROM). Where appropriate, this ROM may be mask-programmed ROM, programmable ROM (PROM), erasable PROM (EPROM), electrically erasable PROM (EEPROM), electrically alterable ROM (EAROM), or flash memory or a combination of two or more of these. This disclosure contemplates mass storage 606 taking any suitable physical form. Storage 606 may include one or more storage control units facilitating communication between processor 602 and storage 606, where appropriate. Where appropriate, storage 606 may include one or more storages 606. Although this disclosure describes and illustrates particular storage, this disclosure contemplates any suitable storage.

In particular embodiments, I/O interface 608 includes hardware, software, or both providing one or more interfaces for communication between computer system 600 and one or more I/O devices. Computer system 600 may include one or more of these I/O devices, where appropriate. One or more of these I/O devices may enable communication between a person and computer system 600. As an example and not by way of limitation, an I/O device may include a keyboard, keypad, microphone, monitor, mouse, printer, scanner, speaker, still camera, stylus, tablet, touch screen, trackball, video camera, another suitable I/O device or a combination of two or more of these. An I/O device may include one or more sensors. This disclosure contemplates any suitable I/O devices and any suitable I/O interfaces 608 for them. Where appropriate, I/O interface 608 may include one or more device or software drivers enabling processor 602 to drive one or more of these I/O devices. I/O interface 608 may include one or more I/O interfaces 608, where appropriate. Although this disclosure describes and illustrates a particular I/O interface, this disclosure contemplates any suitable I/O interface.

In particular embodiments, communication interface 610 includes hardware, software, or both providing one or more interfaces for communication (such as, for example, packet-based communication) between computer system 600 and one or more other computer systems 600 or one or more networks. As an example and not by way of limitation, communication interface 610 may include a network interface controller (NIC) or network adapter for communicating with an Ethernet or other wire-based network or a wireless NIC (WNIC) or wireless adapter for communicating with a wireless network, such as a WI-FI network. This disclosure contemplates any suitable network and any suitable communication interface 610 for it. As an example and not by way of limitation, computer system 600 may communicate with an ad hoc network, a personal area network (PAN), a local area network (LAN), a wide area network (WAN), a metropolitan area network (MAN), or one or more portions of the Internet or a combination of two or more of these. One or more portions of one or more of these networks may be wired or wireless. As an example, computer system 600 may communicate with a wireless PAN (WPAN) (such as, for example, a BLUETOOTH WPAN), a WI-FI network, a WI-MAX network, a cellular telephone network (such as, for example, a Global System for Mobile Communications (GSM) network), or other suitable wireless network or a combination of two or more of these. Computer system 600 may include any suitable communication interface 610 for any of these networks, where appropriate. Communication interface 610 may include one or more communication interfaces 610, where appropriate. Although this disclosure describes and illustrates a particular communication interface, this disclosure contemplates any suitable communication interface.

In particular embodiments, bus 612 includes hardware, software, or both coupling components of computer system 600 to each other. As an example and not by way of limitation, bus 612 may include an Accelerated Graphics Port (AGP) or other graphics bus, an Enhanced Industry Standard Architecture (EISA) bus, a front-side bus (FSB), a HYPERTRANSPORT (HT) interconnect, an Industry Standard Architecture (ISA) bus, an INFINIBAND interconnect, a low-pin-count (LPC) bus, a memory bus, a Micro Channel Architecture (MCA) bus, a Peripheral Component Interconnect (PCI) bus, a PCI-Express (PCI-X) bus, a serial advanced technology attachment (SATA) bus, a Video Electronics Standards Association local (VLB) bus, or another suitable bus or a combination of two or more of these. Bus 612 may include one or more buses 612, where appropriate. Although this disclosure describes and illustrates a particular bus, this disclosure contemplates any suitable bus or interconnect.

Herein, reference to a computer-readable storage medium encompasses one or more non-transitory, tangible computer-readable storage media possessing structure. As an example and not by way of limitation, a computer-readable storage medium may include a semiconductor-based or other integrated circuit (IC) (such, as for example, a field-programmable gate array (FPGA) or an application-specific IC (ASIC)), a hard disk, an HDD, a hybrid hard drive (HHD), an optical disc, an optical disc drive (ODD), a magneto-optical disc, a magneto-optical drive, a floppy disk, a floppy disk drive (FDD), magnetic tape, a holographic storage medium, a solid-state drive (SSD), a RAM-drive, a SECURE DIGITAL card, a SECURE DIGITAL drive, or another suitable computer-readable storage medium or a combination of two or more of these, where appropriate. Herein, reference to a computer-readable storage medium excludes any medium that is not eligible for patent protection under 35 U.S.C. §101. Herein, reference to a computer-readable storage medium excludes transitory forms of signal transmission (such as a propagating electrical or electromagnetic signal per se) to the extent that they are not eligible for patent protection under 35 U.S.C. §101. A computer-readable non-transitory storage medium may be volatile, non-volatile, or a combination of volatile and non-volatile, where appropriate.

This disclosure contemplates one or more computer-readable storage media implementing any suitable storage. In particular embodiments, a computer-readable storage medium implements one or more portions of processor 602 (such as, for example, one or more internal registers or caches), one or more portions of memory 604, one or more portions of storage 606, or a combination of these, where appropriate. In particular embodiments, a computer-readable storage medium implements RAM or ROM. In particular embodiments, a computer-readable storage medium implements volatile or persistent memory. In particular embodiments, one or more computer-readable storage media embody software. Herein, reference to software may encompass one or more applications, bytecode, one or more computer programs, one or more executables, one or more instructions, logic, machine code, one or more scripts, or source code, and vice versa, where appropriate. In particular embodiments, software includes one or more application programming interfaces (APIs). This disclosure contemplates any suitable software written or otherwise expressed in any suitable programming language or combination of programming languages. In particular embodiments, software is expressed as source code or object code. In particular embodiments, software is expressed in a higher-level programming language, such as, for example, C, Perl, or a suitable extension thereof. In particular embodiments, software is expressed in a lower-level programming language, such as assembly language (or machine code). In particular embodiments, software is expressed in JAVA. In particular embodiments, software is expressed in HyperText Markup Language (HTML), Extensible Markup Language (XML), or other suitable markup language.

The present disclosure encompasses all changes, substitutions, variations, alterations, and modifications to the example embodiments herein that a person having ordinary skill in the art would comprehend. Similarly, where appropriate, the appended claims encompass all changes, substitutions, variations, alterations, and modifications to the example embodiments herein that a person having ordinary skill in the art would comprehend.

What is claimed is:

1. A method comprising:
    receiving, at one or more first computing devices, a write request and data associated with the write request from a second computing device;
    selecting from a cache, by the one or more first computing devices, a first storage volume of a plurality of storage volumes, wherein the cache comprises a plurality of unique volume identifiers, wherein the first storage volume is identified by a first unique volume identifier and comprises a plurality of storage nodes, each volume identifier being associated with a storage volume of the plurality of storage volumes, each volume identifier in the cache being associated with a plurality of storage node identifiers, and wherein the cache is maintained locally at the one or more first computing devices;
    sending, by the one or more first computing devices, instructions to write a copy of the data to each storage node of the first storage volume;
    determining, by the one or more first computing devices, that the copy of the data was not successfully written to one or more storage nodes of the first storage volume;
    selecting from the cache, by the one or more first computing devices, a second storage volume of the plurality of storage volumes, wherein the second storage volume is identified by a second unique volume identifier and comprises a plurality of storage nodes;
    sending, by the one or more first computing devices, instructions to write the copy of the data to each storage node of the second storage volume;
    determining, by the one or more first computing devices, that the copy of the data was successfully written to each of the storage nodes of the second storage volume; and
    transmitting, by the one or more first computing devices, the volume identifier of the second storage volume to which the data have been successfully written and a data identifier assigned to the data to the second computing device.

2. The method of claim 1, comprising:
    indicating that the first storage volume is not to be selected for writing; and
    reporting a write failure in connection with the first storage volume to one or more third computing devices.

3. The method of claim 1, wherein when selecting the first storage volume, the first storage volume is not indicated as not to be selected for writing.

4. The method of claim 1, wherein when selecting the first storage volume, the first storage volume has not been selected previously for writing the copy of the data.

5. The method of claim 1, wherein each of the volume identifiers in the cache is associated with an expiration time.

6. The method of claim 5, further comprising:
    by the one or more first computing devices, updating the cache, comprising:
        by the one or more first computing devices, determining that the expiration time of a volume identifier in the cache has passed;
        by the one or more first computing devices, requesting, from one or more fourth computing devices, the plurality of storage nodes that currently belong to the storage volume associated with the volume identifier whose expiration time has passed; and
        by the one or more first computing devices, storing the storage node identifiers associated with the storage nodes that currently belong to the storage volume in the cache.

7. The method of claim 1, comprising:
    before selecting the second storage volume, indicating that the first storage volume is not to be selected for writing.

8. A method comprising:
    receiving, at one or more first computing devices, a read request and a volume identifier and a data identifier associated with the read request from a second computing device, wherein the volume identifier is associated with a storage volume, and the storage volume comprises a plurality of storage nodes;
    selecting from a cache, by the one or more first computing devices, a first storage node of the storage volume associated with the volume identifier, wherein the cache comprises a plurality of unique volume identifiers, each volume identifier being associated with a storage volume of a plurality of storage volumes, each volume identifier in the cache being associated with a plurality of storage node identifiers, and wherein the cache is maintained locally at the one or more first computing devices;
    sending, by the one or more first computing devices, instructions to read a copy of data identified by the data identifier from the first storage node;

determining, by the one or more first computing devices, that the copy of the data was not successfully read from the first storage node;

selecting from the cache, by the one or more first computing devices, a second storage node of the storage volume associated with the volume identifier;

sending, by the one or more first computing devices, instructions to read the copy of the data from the second storage node;

determining, by the one or more first computing devices, that the copy of the data was successfully read from the second storage node; and transmitting, by the one or more first computing devices, the copy of the data to the second computing device.

9. The method of claim 8, further comprising:

determining that the copy of the data was not successfully read from the first storage node of the storage volume associated with the volume identifier due to the first storage node malfunctioning;

indicating that the storage volume associated with the volume identifier is not to be selected for any operations; and reporting a read failure in connection with the first storage node of the storage volume associated with the volume identifier to one or more third computing devices.

10. The method of claim 8, wherein when selecting the first storage node, the first storage node is not indicated as not to be selected for reading.

11. The method of claim 8, wherein when selecting the first storage node, the first storage node has not been selected previously for reading the copy of the data.

12. The method of claim 8, wherein each of the volume identifiers in the cache is associated with an expiration time.

13. The method of claim 12, further comprising:

by the one or more first computing devices, updating the cache, comprising:

by the one or more first computing devices, determining that the expiration time of a volume identifier in the cache has passed;

by the one or more first computing devices, requesting, from one or more fourth computing devices, the plurality of storage nodes that currently belong to the storage volume associated with the volume identifier whose expiration time has passed; and by the one or more first computing devices, storing the storage node identifiers associated with the storage nodes that currently belong to the storage volume in the cache.

14. A first system comprising:

a memory comprising instructions executable by one or more processors; and the one or more processors coupled to the memory and operable to execute the instructions, the one or more processors being operable when executing the instructions to:

receive a write request and data associated with the write request from a second system;

select from a cache a first storage volume of a plurality of storage volumes, wherein the cache comprises a plurality of unique volume identifiers, wherein each storage volume of the plurality of storage volumes is identified by a unique volume identifier and comprises a plurality of storage nodes, each volume identifier being associated with a storage volume of the plurality of storage volumes, each volume identifier in the cache being associated with a plurality of storage node identifiers, and wherein the cache is maintained locally at the first system;

send instructions to write a copy of the data to each of the storage nodes of the first storage volume;

determine that the copy of the data was not successfully written to one or more storage nodes of the first storage volume;

select from the cache a second storage volume of the plurality of storage volumes;

send instructions to write the copy of the data to each of the storage nodes of the second storage volume;

determine that the copy of the data was successfully written to each of the storage nodes of the second storage volume; and transmit the volume identifier of the second storage volume to which the data have been successfully written and a data identifier assigned to the data to the second system.

15. The first system of claim 14, wherein the one or more processors are further operable when executing the instructions to:

indicate that the first storage volume is not to be selected for writing; and report a write failure in connection with the first storage volume to one or more third systems.

16. The first system of claim 14, wherein when selecting the first storage volume, the first storage volume is not indicated as not to be selected for writing.

17. The first system of claim 14, wherein when selecting the first storage volume, the first storage volume has not been selected previously for writing the copy of the data.

18. The first system of claim 14, wherein the one or more processors are further operable when executing the instructions to:

receive a read request from the second system, wherein the read request comprises the volume identifier of the second storage volume and the data identifier;

select a first storage node of the second storage volume;

send instructions to read a copy of the data from the first storage node;

determine that the copy of the data was not successfully read from the first storage node;

select a second storage node of the second storage volume;

send instructions to read the copy of the data from the second storage node;

determine that the copy of the data was successfully read from the second storage node; and transmit the copy of the data to the second system.

19. The first system of claim 18, wherein the one or more processors are further operable when executing the instructions to:

determine that the copy of the data was not successfully read from the first storage node of the second storage volume due to the first storage node malfunctioning;

indicate that the second storage volume is not to be selected for any operations; and report a read failure in connection with the first storage node of the second storage volume to one or more third systems.

20. The first system of claim 18, wherein when selecting the first storage node, the first storage node has not been selected previously for reading the copy of the data.

21. The first system of claim 14, wherein each of the volume identifiers in the cache is associated with an expiration time.

22. The first system of claim 21, wherein the one or more processors are further operable when executing the instructions to:
- update the cache, comprising:
  - determine that the expiration time of a volume identifier in the cache has passed;
  - request the plurality of storage nodes that currently belong to the storage volume associated with the volume identifier whose expiration time has passed from one or more fourth systems; and
  - store the storage node identifiers associated with the storage nodes that currently belong to the storage volume in the cache.

* * * * *